(12) United States Patent
Fukushima

(10) Patent No.: US 7,486,955 B2
(45) Date of Patent: Feb. 3, 2009

(54) ELECTRONIC DEVICE WITH ANTENNA FOR WIRELESS COMMUNICATION

(75) Inventor: Kazuya Fukushima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 409 days.

(21) Appl. No.: 10/950,894

(22) Filed: Sep. 27, 2004

(65) Prior Publication Data
US 2005/0170862 A1 Aug. 4, 2005

(30) Foreign Application Priority Data
Jan. 30, 2004 (JP) .......................... P2004-024022

(51) Int. Cl.
H01Q 1/24 (2006.01)

(52) U.S. Cl. ............... 455/452.1; 455/132; 455/140; 455/41.2; 455/562.1

(58) Field of Classification Search ............ 455/556.1, 455/272, 277.1, 272.2, 275, 552.1, 132, 140, 455/562.1, 575.7, 41.2; 343/702, 700, 848, 343/879; 370/338, 341
See application file for complete search history.

(56) References Cited

U.S. PATENT DOCUMENTS

| | | | |
|---|---|---|---|
| 6,426,723 B1 * | 7/2002 | Smith et al. ........... 343/700 MS |
| 6,509,877 B2 * | 1/2003 | Masaki ................. 343/702 |
| 6,560,443 B1 * | 5/2003 | Vaisanen et al. ........... 455/73 |
| 6,862,433 B2 * | 3/2005 | Callaway, Jr. ............ 455/101 |
| 6,917,815 B2 * | 7/2005 | Hajimiri et al. .......... 455/552.1 |
| 6,978,121 B1 * | 12/2005 | Lane et al. .............. 455/73 |
| 7,046,649 B2 * | 5/2006 | Awater et al. ............ 370/338 |
| 7,088,965 B1 * | 8/2006 | Ngan .................... 455/114.2 |
| 7,155,252 B2 * | 12/2006 | Martin et al. ............ 455/553.1 |
| 7,299,127 B2 * | 11/2007 | Willer et al. ............. 701/213 |
| 2002/0024469 A1 | 2/2002 | Masaki |
| 2003/0008660 A1 * | 1/2003 | Forrester .............. 455/456 |
| 2003/0050032 A1 * | 3/2003 | Masaki ................ 455/272 |
| 2003/0222823 A1 * | 12/2003 | Flint et al. .............. 343/702 |
| 2004/0209611 A1 * | 10/2004 | Van Erven ............. 455/422.1 |
| 2005/0192048 A1 * | 9/2005 | Bridgelall ............. 455/553.1 |

FOREIGN PATENT DOCUMENTS

| | | |
|---|---|---|
| EP | 1083622 A2 | 3/2001 |
| EP | 1294048 A2 | 3/2002 |
| JP | 09-102764 | 4/1997 |
| JP | 09102764 | 4/1997 |
| JP | 09/181660 | 7/1997 |
| JP | 10/163941 | 6/1998 |

OTHER PUBLICATIONS

European Search Report from a related application dated Jun. 3, 2008 for application No. EP 05704280.6.

* cited by examiner

Primary Examiner—Duc Nguyen
Assistant Examiner—Julio R Perez
(74) Attorney, Agent, or Firm—Blakely, Sokoloff, Taylor & Zafman LLP

(57) ABSTRACT

An electronic device comprises an antenna, a first wireless communication module coupled to the antenna, which is complied with a first communication protocol, a second wireless communication module coupled to the antenna, which is complied with a second communication protocol, and a filter coupled to the antenna, the first wireless communication module, and the second wireless communication module. The filter distributes a signal received by the antenna to one of the first wireless communication module and the second wireless communication module in accordance with frequency of the signal.

7 Claims, 2 Drawing Sheets

ELECTRONIC DEVICE WITH ANTENNA FOR WIRELESS COMMUNICATION

CROSS-REFERENCE TO RELATED APPLICATIONS

This application is based upon and claims the benefit of priority from Japanese Patent Application No. 2004-24022, filed Jan. 30, 2004, the entire contents of which are incorporated herein by reference.

BACKGROUND

1. Field

This invention relates to an electronic device with an antenna for wireless communication, such as a portable computer.

2. Description of the Related Art

With remarkable progress in technology concerning an electronic device such as a portable computer in recent years, a wireless communication module such as wireless LAN or BLUETOOTH™ is mounted on some of such electronic devices.

A wireless LAN module features two antennas, namely a main antenna for performing transmission and reception and an auxiliary antenna for performing only reception. The structure with these two antennas contributes to improved radio reception quality, because the wireless LAN module switches between the main antenna and the auxiliary antenna according to a reception state, and maintains control of radio reception quality so as to maintain a more sensitive reception state. This is sometimes referred to as "spatial diversity reception".

On the other hand, in the BLUETOOTH™ module, only one antenna for performing transmission and reception is provided. In addition, in the case where the wireless LAN module conforms to the IEEE 802.11b standard, the BLUETOOTH™ module and available frequency bandwidth overlap each other. When they are used at the same time, radio interference occurs, and each module may experience communication speed degradation.

From this point of view, in general, an antenna of the wireless LAN module and an antenna of the BLUETOOTH™ module are made independent of each other, and a total of 3 antennas are provided so as to suppress radio interference to a minimum. However, in a small sized electronic device such as a portable computer, downsizing and high density are required. Thus, there is tendency that an increasingly smaller space for mounting an antenna may be allocated in a cabinet.

For example, U.S. Pat. No. 6,560,443 discloses a multi-transceiver mobile terminal with two types of wireless communication modules that apply a technique of selectively switching one or two antennas by means of an antenna switching circuitry so as to share these modules. In this reference, the number of antennas mounted is reduced to two. However, this technique requires a control circuit for controlling the antenna switching circuitry to be switched according to the wireless communication state or the like of each of the wireless communication modules, and makes configuration complicated. In addition, one of two wireless communication modules is selectively used. In other words, only one wireless communication module can be connected to the antenna at a time, and the other module cannot be used at the same time.

BRIEF DESCRIPTION OF THE SEVERAL VIEWS OF THE DRAWINGS

The accompanying drawings, which are incorporated in and constitute a part of the specification, illustrate embodiments of the invention, and together with the detailed description of the embodiments given below, serve to explain the principles of the invention.

DETAILED DESCRIPTION

Various embodiments according to the present invention will be described hereinafter with reference to the accompanying drawings. In general, according to one embodiment of the invention, an electronic device comprises an antenna, a first wireless communication module coupled to the antenna, which operates in accordance with a first communication protocol, a second wireless communication module coupled to the antenna, which is operates in accordance with a second communication protocol, and a filter coupled to the antenna, the first wireless communication module, and the second wireless communication module. The filter distributes a signal received by the antenna to one of the first wireless communication module and the second wireless communication module in accordance with frequency of the signal.

Figure 1:
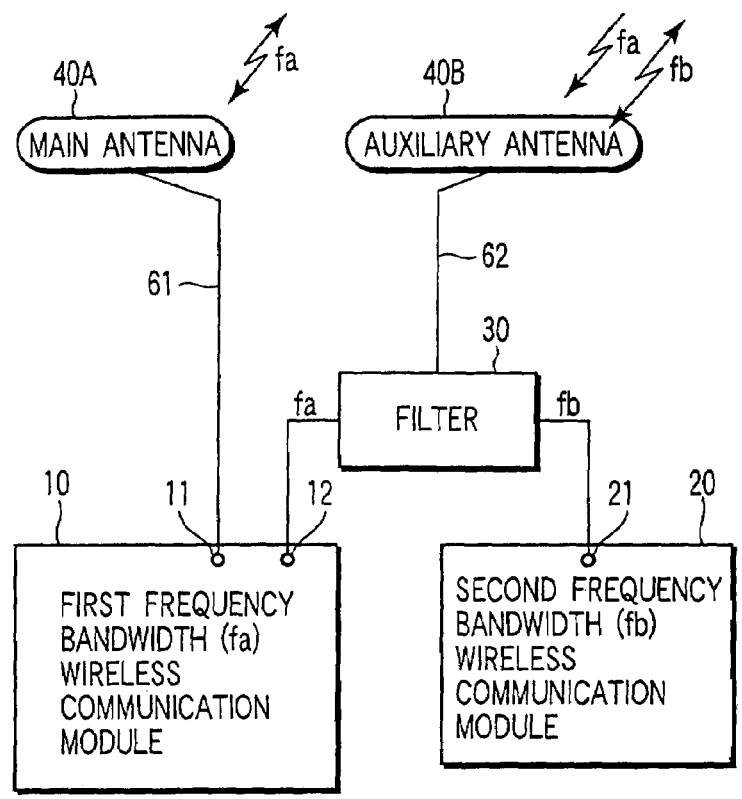
FIG. 1 is an exemplary block diagram showing a configuration of an electronic device according to a embodiment of the invention.

According to an embodiment, FIG. 1 shows an exemplary configuration of an electronic device that is a personal computer in this embodiment.

The electronic device is composed of a first wireless communication module 10, a second wireless communication module 20, a filter 30, and a plurality of antennas, such as a main antenna 40A, and an auxiliary antenna 40B.

The first wireless communication module 10 makes communication due to spatial diversity reception with an external device by using a first frequency bandwidth fA. The second wireless communication module 20 makes communication with an external device by means of a single antenna by using a second frequency bandwidth fB, which is different from the above first frequency bandwidth fA. The first wireless communication module 10 has a transmission and reception antenna connection terminal 11 connected to the main antenna 40A for enabling spatial diversity reception, and a reception antenna connection terminal 12. The second wireless communication module 20 has a single transmission and reception antenna connection terminal 21.

When the first wireless communication module 10 communicates with an external device, the main antenna 40A performs transmission and reception in spatial diversity reception, and the auxiliary antenna 40B performs reception only.

The main antenna 40A is connected to the transmission and reception antenna connection terminal 11 of the wireless communication module 10 via a first antenna cable 61, and the auxiliary antenna 40B is connected to a filter 30 via a second antenna cable 62.

The filter 30 is connected among the reception antenna connection terminal 12 of the first wireless communication module 10, the antenna connection terminal 21 of the second wireless communication module 20, and the auxiliary antenna 40B. The filter 30 discriminates and isolates a high frequency signal of the first frequency bandwidth fA between the auxiliary antenna 40B and the reception antenna connection terminal 12 of the first wireless communication nodule 10, and a high frequency signal of the second frequency bandwidth fB between the auxiliary antenna 40B and the antenna connection terminal 21 of the second wireless communication module 20. Accompanying with the discrimination, the filter 30 distributes the high frequency signal to the appropriate one of the first wireless communication nodule 10, and the second wireless communication module 20, in accordance with an attribute of the signal such as frequency.

Figure 2:
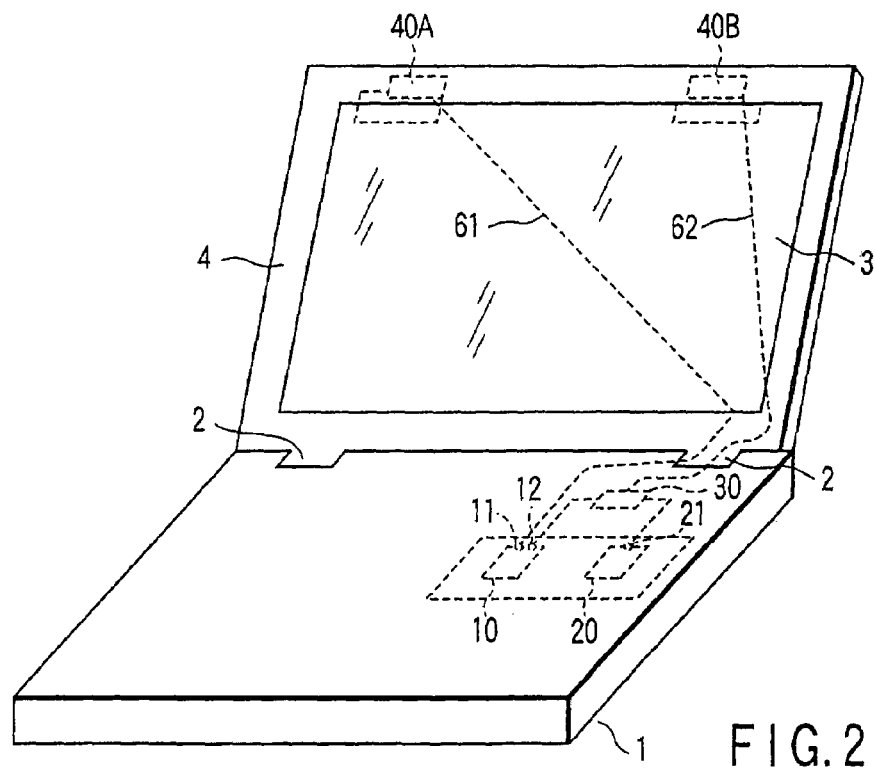
FIG. 2 is an exemplary diagram showing a layout of antennas and wireless communication modules according to the embodiment.

FIG. 2 shows an exemplary layout configuration when the wireless communication modules 10, 20, the filter 30, and the antennas 40A, 40B are applied to a portable computer.

The portable computer incorporates the first wireless communication module 10, the second wireless communication module 20, and the filter 30 in a main housing 1. The main unit 1 is pivotably coupled to a display 3 provided in a display housing 4 via hinge mechanisms 2. The main antenna 40A and the auxiliary antenna 40B are provided at two locations at its open end side of the display housing 3, separated by a predetermined distance. The main antenna 40A is connected to the transmission and reception antenna connection terminal 11 of the first wireless communication module 10 via the first antenna cable 61. The auxiliary antenna 40B is connected to the filter 30 via the second antenna cable 62.

In the above-described configurations shown in FIGS. 1 and 2, the first wireless communication module 10 makes communication due to spatial diversity reception with an external device at the first frequency bandwidth fA by using the main antenna 40A and the auxiliary antenna 40B. On the other hand, the second wireless communication module 20 makes communication with an external device by using the auxiliary antenna 40B in accordance with a predetermined communication protocol.

At this time, the high frequency signal of the first frequency bandwidth fA between the auxiliary antenna 40B and the first wireless communication module 10 is isolated from the high frequency signal of the second frequency bandwidth fB between the auxiliary antenna 40B and the second wireless communication module 20 by means of the filter 30.

By using such an antenna circuit, the first wireless communication module 10 makes wireless communication with an external device due to spatial diversity reception by the main antenna 40A and the auxiliary antenna 40B. The second wireless communication module 20 can simultaneously make wireless communication with an external device by using the auxiliary antenna 40B. In other words, wireless communications of both the first wireless communication module 10 and the second wireless communication module 20 are performed concurrently by using the main antenna 40A and the auxiliary antenna 40B.

Figure 3:
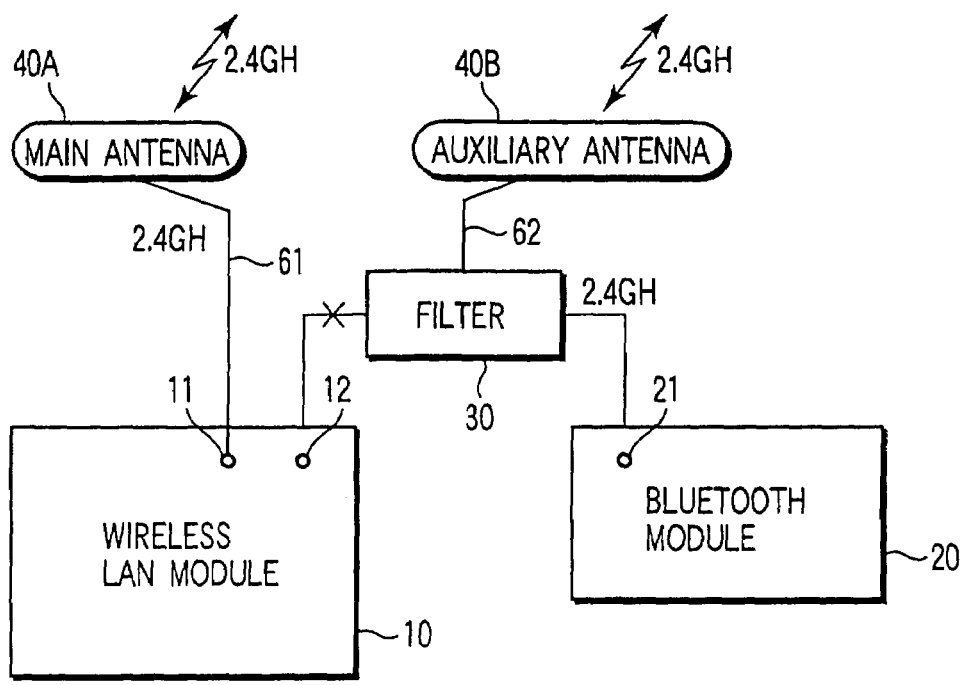
FIG. 3 is an exemplary block diagram showing a configuration of the electronic device when the frequency bandwidths of the wireless communication modules interfere with each other according to the embodiment.
Figure 4:
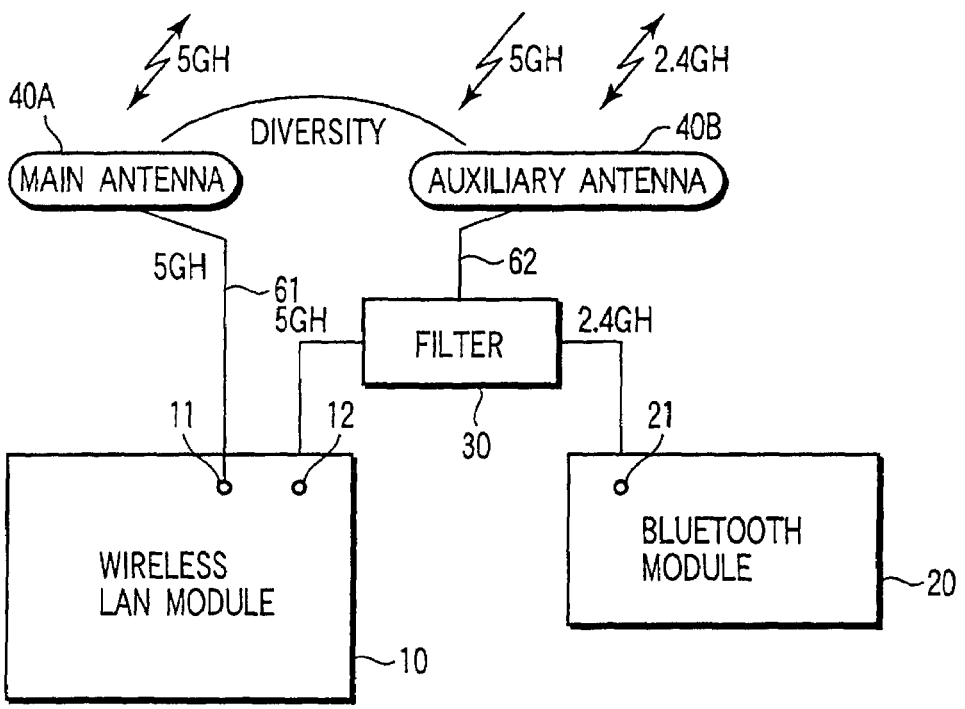
FIG. 4 is an exemplary block diagram showing a configuration of the electronic device when each frequency bandwidth of the wireless communication modules is different from each other according to the embodiment.

FIGS. 3 and 4 shows examples in which the first wireless communication module 10 operates in accordance with a wireless LAN, e.g. IEEE 802.11a, b, and g standard, and the second wireless communication module 20 is complied with BLUETOOTH™.

FIG. 3, in particular, shows a configuration of the electronic device when the frequency bandwidth of the wireless LAN module 10 interferes with the frequency bandwidth of the BLUETOOTH™ module 20 (hereinafter "BT" module).

In this example, the frequency bandwidth used by the wireless LAN module 10 is defined as a 2.4 GHz bandwidth in accordance with the IEEE 802.11b or IEEE 802.11g standard. Therefore, the available frequency bandwidth of the wireless LAN module 10 overlaps with the available frequency bandwidth, such as the 2.4 GHz bandwidth, of the BT module 20. To avoid interference, while in transmission of the BT module 20, the wireless LAN module 10 makes communication by using only the main antenna 40A without using the auxiliary antenna 40B.

In this manner, the wireless LAN module 10 suppresses interference between the modules 10 and 20 while the BT module 20 is performing transmission by using the auxiliary antenna 40B. Thus, a diversity reception control function is unavailable, but the wireless LAN module 10 and the BT module 20 may make communication with each counterpart external device concurrently.

FIG. 4 shows an example that each frequency bandwidth of the wireless communication modules is different from each other.

In this example, the frequency bandwidth used by the wireless LAN module 10 is defined as a 5 GHz bandwidth in accordance with IEEE 802.11a standard. At this time, the available frequency bandwidth, 5 GHz bandwidth, of the wireless LAN module 10 is different from the available frequency bandwidth, 2.4 GHz bandwidth, of the BT module 20. Thus, the wireless LAN module 10 utilizes the diversity reception control function by using the main antenna 40A and the auxiliary antenna 40B, and the BT module 20 is capable of making communication to a counterpart external device by using the auxiliary antenna 40B concurrently, respectively.

At this time, the filter 30 discriminates and isolates the high frequency signal of the 5 GHz bandwidth between the auxiliary antenna 40B and the wireless LAN module 10 and the high frequency signal of the 2.4 GHz bandwidth between the auxiliary antenna 40B and the BT module 20. After the discrimination, the filter 30 transmits the high frequency signal of the 5 GHz bandwidth to the wireless LAN module 10, and transmits the high frequency signal of the 2.4 GHz bandwidth to the BT module 20.

In this manner, the high frequency signals of both 5 GHz bandwidth and 2.4 GHz bandwidth received by the auxiliary antenna 40B are properly sent to one of the wireless LAN module 10 and the BT module 20.

Although there has been shown an example of the antenna circuit with the wireless LAN module 10 of 2.4 GHz/5 GHz in available frequency bandwidth and the BT module 20 of 2.4 GHz bandwidth, the present invention is not limited thereto, but is applicable to another equipment having a diversity reception control function. In addition, for example, the present invention is properly applicable to another wireless communication system such as Home PNA which stands for HomePhone line Networking Alliance. Moreover, with respect to type of an antenna available as well, for example, a variety of antennas such as a dipole antenna, a monopole antenna, and a reverse F antenna are applicable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device, comprising:
a first antenna;
a second antenna;
a first wireless communication module coupled to the first antenna and the second antenna and operating in accordance with a first communication protocol;
a second wireless communication module coupled to the second antenna and operating in accordance with a second communication protocol; and
a filter coupled to the second antenna, the first wireless communication module, and the second wireless communication module, the filter distributing a signal received by the second antenna to one of the first wireless communication module and the second wireless communication module in accordance with a frequency of the signal allowing the first wireless communication module to operate concurrently with the second wireless communication module, and
wherein the first wireless communication module makes communication without using the second antenna when the second wireless communication module makes communication in a second frequency bandwidth overlapping with a first frequency bandwidth available to the first wireless communication module.

2. The electronic device according to claim 1, wherein the first wireless communication module uses the first frequency bandwidth, and the second wireless communication module uses the second frequency bandwidth different than the first frequency bandwidth.

3. The electric device according to claim 2, wherein the first wireless communication module and the second wireless communication module concurrently transmit signals through the first antenna and the second antenna and the filter distributes the signal with the first frequency bandwidth of up to 5 gigahertz to the first wireless communication module and the signal with the second frequency bandwidth of up to 2.4 gigahertz to the second wireless communication module.

4. The electric device according to claim 1, wherein the first communication protocol is in accordance with one of IEEE 802.11a, IEEE 802.11b, and IEEE 802.11g standard, and the second communication protocol is BLUETOOTH™.

5. The wireless communication method according to claim 1, wherein the second frequency bandwidth is less than one-half of the first frequency bandwidth.

6. A wireless communication method, comprising:
transmitting a signal in compliance with a first communication protocol through a first antenna;
receiving a signal in compliance with the first communication protocol through the first antenna and a second antenna, the signal received by the second antenna being used for the first communication protocol when the frequency of the signal is in accordance with that of the first communication protocol;
transmitting a signal in compliance with a second communication protocol through the second antenna; and
receiving a signal complied with the second communication protocol through the second antenna, the signal received by the second antenna being used for the second communication protocol when the frequency of the signal is in accordance with that of the second communication protocol,
wherein the second antenna is coupled to a filter coupling to a first wireless communication module operating in accordance with the first communication protocol and a second wireless communication module operating in accordance with the second communication protocol and concurrently with the first wireless communication module, and distributing a signal received by the second antenna to one of the first wireless communication module and the second wireless communication module in accordance with a frequency of the signal.

7. The wireless communication method according to claim 6, wherein the transmitting of the signal in compliance with the first communication protocol is conducted by the first wireless communication module and concurrently with the transmitting of the signal in compliance with the second communication protocol by the second wireless communication module.

* * * * *